United States Patent
Sato et al.

(10) Patent No.: US 8,035,702 B2
(45) Date of Patent: Oct. 11, 2011

(54) PIXEL DEFECT CORRECTION DEVICE FOR LINE CRAWL

(75) Inventors: Hidehiko Sato, Tokyo (JP); Sumito Yoshikawa, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 1718 days.

(21) Appl. No.: 11/268,365

(22) Filed: Nov. 7, 2005

(65) Prior Publication Data
US 2006/0238629 A1    Oct. 26, 2006

(30) Foreign Application Priority Data
Apr. 25, 2005   (JP) ................. 2005-127111

(51) Int. Cl.
 *H04N 5/359* (2011.01)
 *H04N 5/217* (2011.01)
(52) U.S. Cl. ............. 348/241; 348/243; 348/246
(58) Field of Classification Search ........ 348/246–250
   See application file for complete search history.

(56) References Cited

U.S. PATENT DOCUMENTS

| | | | | |
|---|---|---|---|---|
| 5,406,391 A * | 4/1995 | Takahashi | ...... | 358/482 |
| 5,973,736 A * | 10/1999 | Kawamoto et al. | ...... | 348/324 |
| 7,009,644 B1 * | 3/2006 | Sanchez et al. | ...... | 348/247 |
| 7,362,897 B2 * | 4/2008 | Ishiga | ...... | 382/167 |
| 7,400,352 B1 * | 7/2008 | Luo | ...... | 348/241 |
| 7,456,878 B1 * | 11/2008 | Sun et al. | ...... | 348/241 |
| 7,561,194 B1 * | 7/2009 | Luo | ...... | 348/241 |
| 7,733,393 B2 * | 6/2010 | Yoshida et al. | ...... | 348/249 |
| 2002/0071613 A1 * | 6/2002 | Ford et al. | ...... | 382/275 |
| 2002/0196354 A1 * | 12/2002 | Chang et al. | ...... | 348/246 |
| 2003/0043286 A1 * | 3/2003 | Kato | ...... | 348/246 |
| 2003/0214594 A1 * | 11/2003 | Bezryadin | ...... | 348/280 |
| 2004/0032516 A1 * | 2/2004 | Kakarala | ...... | 348/246 |
| 2004/0119856 A1 * | 6/2004 | Nishio et al. | ...... | 348/246 |
| 2004/0246352 A1 * | 12/2004 | Suzuki | ...... | 348/272 |
| 2004/0257467 A1 * | 12/2004 | Nicolas | ...... | 348/452 |
| 2005/0057655 A1 * | 3/2005 | Duesman et al. | ...... | 348/187 |
| 2005/0248671 A1 * | 11/2005 | Schweng | ...... | 348/246 |
| 2006/0152607 A1 * | 7/2006 | Noguchi | ...... | 348/248 |
| 2009/0122165 A1 * | 5/2009 | Kinoshita | ...... | 348/241 |

FOREIGN PATENT DOCUMENTS
JP    9238355    9/1997

* cited by examiner

*Primary Examiner* — David Ometz
*Assistant Examiner* — Dwight C Tejano
(74) *Attorney, Agent, or Firm* — Pamela R. Crocker; Peyton C. Watkins

(57) ABSTRACT

To enhance accuracy in correction of a defective pixel. An image of an object is captured using a digital camera, and stored in an image memory 14. A processor 16 detects a defect, using pixels located in the vertical and horizontal directions relative to, in lines of the same color as, and separated by one line from, the focused line. With any defect found, the presence or absence of line crawl is next determined. When it is determined that line crawl is present, the presence or absence of a diagonal edge is then determined. Subsequently, the surrounding pixels used to correct a defective pixel are selected in consideration of whether or not line crawl or a diagonal edge are present.

8 Claims, 9 Drawing Sheets

PIXEL DEFECT CORRECTION DEVICE FOR LINE CRAWL

FIELD OF THE INVENTION

The present invention relates to a device for correcting a defect which is present in a group of pixels supplied with image data obtained using an image capturing device such as a CCD.

BACKGROUND OF THE INVENTION

Conventional techniques for detecting a defective pixel in a two dimensional image capturing element such as a CCD, and correcting the defective pixel by utilizing the pixels around that pixel, are known.

Japanese Patent Laid-open Publication No. Hei 9-238355 discloses a technique for removing line crawl by outputting a Gb in a Bayer array after being multiplied by a line crawl correction, and outputting Gr intact.

"Line crawl" is a phenomena which may occur under the following conditions. That is, when a color filter comprising R, G, B small color filters in a Bayer array is provided on a light receiving filter, a long wavelength light which has passed through an R small color filter reaches a deeper site under the light receiving surface and generates electric charge therein. The charge then leaks into the adjacent pixels, becoming noise. With such noise, or electric charge invading into pixels having B or G small filters, the sensitivities of the respective pixels become inconsistent, even when an image of a uniformly colored object having no pattern is captured. Line crawl occurs not only in filters employing a Bayer array, but also in those employing any other color arrays.

Defective pixels of an image capturing element, such as a CCD, may inconsistently increase or decrease due to, for example, increased temperature, long time exposure, and so forth. To detect and correct such a defective pixel, pixels surrounding that pixel are utilized.

However, use of the pixels adjacent to the focused pixel cannot guarantee accurate detection and correction due to the influence of line crawl. In order to avoid the influence of line crawl, use of four pixels in the detection and correction, which are located in lines of the same color as, and separated by one line from, the focused pixel is contemplated.

FIG. 14 illustrates a method for detecting and correcting a defect in a focused pixel. Specifically, among pixels in a Bayer array, or, precisely, pixels having color filters in a Bayer array, (hereinafter simply referred to as pixels), four pixels, namely, pixels 102 (G1), 104 (G2), 106 (G3), 108 (G4), which are located in vertical and horizontal directions relative to, and in lines of the same color as, the focused pixel, namely Gorg, are used as defect detection pixels.

For example, when the pixel Gorg is a G pixel in a G (green)/B (blue) line, four pixels, namely, G1, G2, G3, G4, which are located in G/B lines each separated by one line from the G/B line of the focused line, are used as defect detection pixels. Based on these four pixels G1, 62, G3, G4, the pixel value at the position of the pixel Gorg is estimated, and the estimated pixel value is compared to the actual pixel value of the pixel Gorg.

When the difference between the estimated and actual pixel values of the pixel Gorg is significantly large such that it exceeds a predetermined threshold, it is assumed that an inappropriate value which cannot be estimated based on the values of the pixels around the focused pixel be included, and it is concluded that the pixel Gorg is defective.

When the pixel Gorg is determined to be defective, the same four pixels G1, G2, G3, G4, used for the defect detection, are used also for correction of the pixel Gorg as correction pixels 110, 112, 114, 116. That is, the pixel value of the pixel Gorg is replaced by the estimated value based on pixels G1 through G4.

Use of the pixels surrounding but separated by one line from the focused pixel can eliminate the influence of line crawl. However, this manner of correction suffers from deteriorated sharpness of an image as the pixels used for the correction are separated from the focused pixel by one line.

In addition, should the original image have an edge in a diagonal direction, or a diagonal edge, which includes a defective pixel, application of this correction method results in undesirable disappearance of the diagonal edge, which should be inherent to the original image.

FIG. 15 shows an example in which the original image includes an edge 120 in the diagonal direction which includes the pixel Gorg. The defective pixel Gorg is corrected based on the pixels G1 through G4 located in vertical and horizontal directions relative to the defective pixel Gorg. However, as these pixels G1 through G4 contains no pixel information of the edge 120, the corrected pixel Gorg naturally contains no edge information. Therefore, the edge 120, which is present before the correction, partly disappears after the correction, as shown in FIG. 15 (b).

The present invention advantageously provides a device for reliably correcting a defective pixel while eliminating the influence of line crawl and preserving diagonal edges.

SUMMARY OF THE INVENTION

According to the present invention, there is provided a pixel defect correction device for correcting a defect in any pixel in a group of pixels arranged as predetermined, comprising defect detection means for detecting a defect in a focused pixel, using pixels surrounding the focused pixel; line crawl determination means for determining presence or absence of line crawl around a defective pixel; and correction means for correcting the defective pixel using pixels selected according to the presence or absence of a line crawl.

The present invention does not correct a defective pixel based on an assumption that line crawl is caused, but rather determines whether or not line crawl is actually caused so that a correction method to use in correction of a defective pixel is modified depending on the presence or absence of line crawl.

In one embodiment of the present invention, when line crawl is caused, whether or not a diagonal edge is present is determined so that a correction method to use in correction of a defective pixel is modified depending on the presence or absence of a diagonal edge. When line crawl is not caused, on the other hand, the defect of the defective pixel is verified, and a correction method to use in correction of a defective pixel is modified depending on the result of the verification.

Modification of a correction method depending on the presence or absence of a diagonal edge enables correction of the defective pixel while preserving the diagonal edge of the original image, while modification of a correction method depending on the presence or absence of line crawl enables correction of the defective pixel while preserving the sharpness of the original image.

According to the present invention, a correction method is modified so as to use different pixels in correction, depending on the presence or absence of line crawl. This enhances the accuracy of correction of defective pixels.

DETAILED DESCRIPTION OF THE INVENTION

In the following, a preferred embodiment of the present invention will be described while referring to a Bayer array as an example, based on the accompanied drawings.

Figure 1:
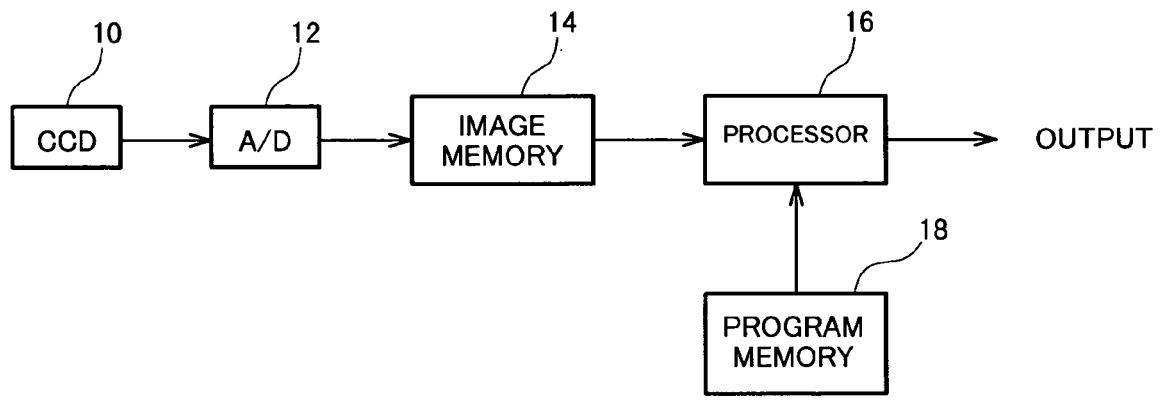
FIG. 1 is a structural block diagram of an embodiment of the present invention.

FIG. 1 is a structural block diagram for a digital camera according to the embodiment. In the drawing, components including an optical system including a lens, a shutter, and so forth; a display device; and various switches are omitted for clarity, as such components are well known.

A CCD 10 has a color filter in a Bayer array, and photo-electrically converts the image of an object before outputting a pixel signal for an R pixel, a G pixel, and a B pixel. An A/D 12, having received an analogue pixel signal from the CCD 10, converts the signal into a digital signal which it then outputs as a pixel value to a subsequent image memory 14. The image memory 14 sequentially stores the respective pixel values. A processor 16 sequentially reads out the pixel values from the image memory 14 and carries out defect detection and defective pixel correction. The processor 16 additionally performs γ correction, white balance adjustment, brightness color difference signal conversion, JPEG conversion, and so forth before outputting the signal. These processes are carried out by the processor 16 according to a program stored beforehand in the program memory 18. Specifically, the program contains a defect detection module and a defective pixel correction module, and the processor 16 sequentially executes these modules.

While the defect detection method in this embodiment is similar to a conventional method, a defective pixel correction method in this embodiment differs from conventional methods as it comprises the steps outlined as below.

The line crawl detection step is a step to determine if any line crawl is caused in a defective pixel or the neighboring area.

The diagonal edge detection step is a step to determine, when line crawl is detected, if a diagonal edge which contains a defective pixel is included in an original image.

The defective pixel verification step is a step to verify the defect of a defective pixel, using surrounding pixel but different from those previously used in the detection, which is carried out when no line crawl is detected.

In this embodiment, a defective pixel correction method is adaptively modified for implementation in consideration of the results of the steps (1) through (3). These steps will next be described in detail.

Figure 2:
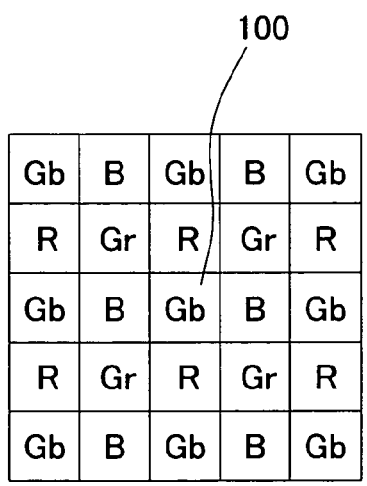
FIG. 2 is a diagram explaining pixels in a Bayer array.

FIG. 2 shows pixels in a Bayer array, in which G/B lines and G/R lines are alternately arranged. Pixel G in a G/B line is referred to as pixel Gb, while pixel G in a G/R line is referred to as pixel Gr. While focusing on 5×5 pixels, the pixel 100 located at the center of those pixels is determined to be a focused pixel. The focused pixel in the drawing is pixel Gb as being pixel G in a G/B line. In the following, the focused pixel is generally referred to as pixel Gorg.

Figure 3:
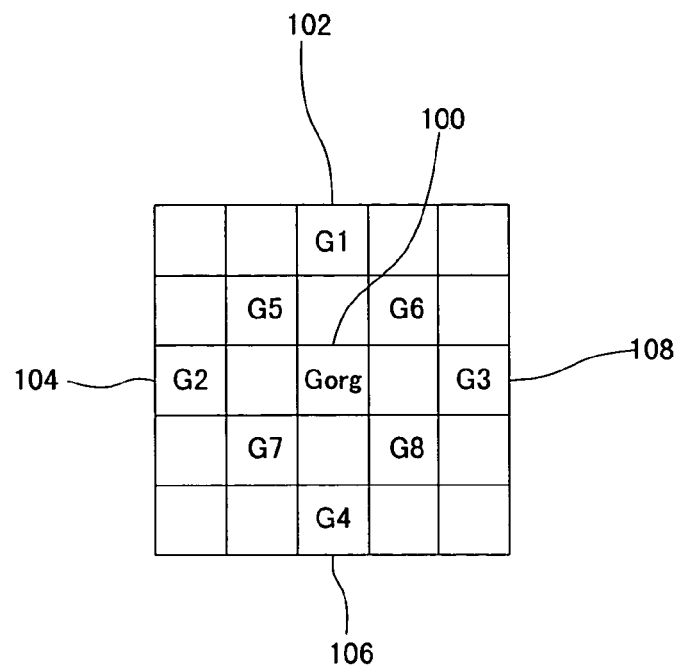
FIG. 3 is a diagram explaining a defective focused pixel.
Figures 14A, 14B:
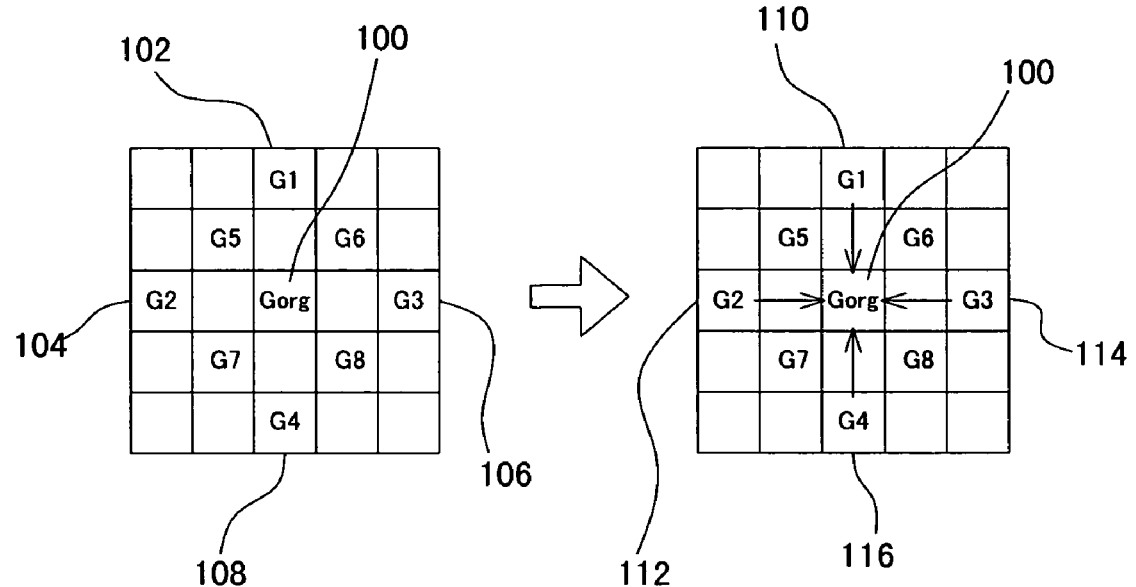
FIG. 14 is a diagram explaining conventional correction processing.
Figures 15A, 15B:
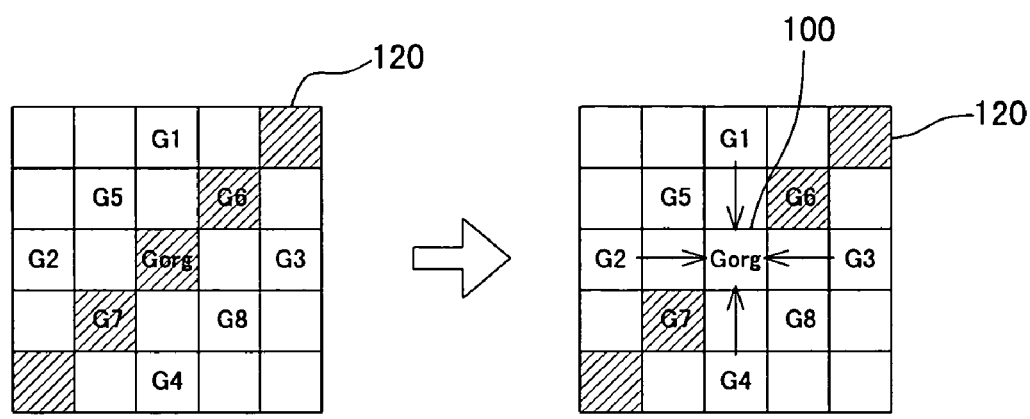
FIG. 15 is a diagram explaining conventional correction processing.

FIG. 3 illustrates a process for detecting a defect in the focused pixel 100 (Gorg). Similar to the conventional method shown in FIG. 14, four pixels, namely, pixel 102 (G1), pixel 104 (G2), pixel 108 (G3), pixel 106 (G4), located in vertical and horizontal directions relative to, in lines of the same color as, and separated by one line from, the focused pixel Gorg, are used as defect detection pixels in detection of a defect in the focused pixel Gorg. Specifically, the pixel value at the position of pixel Gorg is estimated based on the pixel values of these four pixels G1, G2, G3, G4, and whether or not a difference between the estimated and actual pixel values of the focused pixel Gorg is equal to or larger than a threshold value is determined. The estimation is made using a simple average of the pixels G1 through G4, for example.

When the difference exceeds the threshold value, the focused pixel Gorg is provisionally determined to be a defective pixel. A "provisional determination" classification is included in consideration of the possibility that the pixel may later be determined to not be defective.

Figure 4:
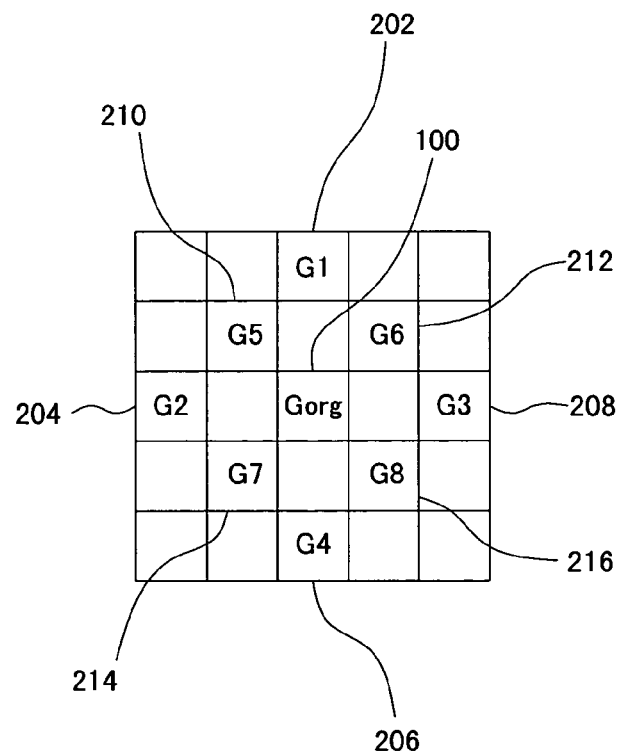
FIG. 4 is a diagram explaining a line crawl determination pixel relative to the focused pixel.

FIG. 4 shows a process for determining whether or not any line crawl is caused, which is applied when the focused pixel Gorg is provisionally determined as a defective pixel. As described above, line crawl is caused particularly when electric charge generated in an R pixel invades into its neighboring pixels.

In view of the above, a pixel value of the pixel Gorg is estimated based on four pixels adjacent to the focused pixel Gorg, namely, pixels 210 (G5), 212 (G6), 214 (G7), and 216 (G8), and the obtained estimated pixel value is compared with the estimated value previously obtained based on the pixels G1 through G4. When no line crawl is caused, these estimated values will in most cases coincide. However, when line crawl is caused, these estimated values will likely differ by an extent corresponding to the noise due to the line crawl. Therefore, a difference between these estimated values is calculated and, when the difference is equal to or larger than a predetermined threshold, it can be determined that line crawl is caused.

As described above, the presence or absence of line crawl is determined using eight pixels, namely G1 through 4 and G5 through G8, around the focused pixel Gorg. That is, these eight pixels serve as line crawl detection pixels 202 through 212.

When any line crawl is detected, it can be recognized that the pixels adjacent to the focused defective pixel cannot not be used for accurate correction. Instead, pixels separated from the focused defective pixel by one line should be used. However, use of the pixel values of the pixels G1 through G4 in correction of the focused pixel Gorg results in problematic disappearance of any diagonal edge, although this problem naturally does not occur when no diagonal edge is present in the original image. Therefore, it is next determined whether or not a diagonal edge is included in the original image.

Figure 5:
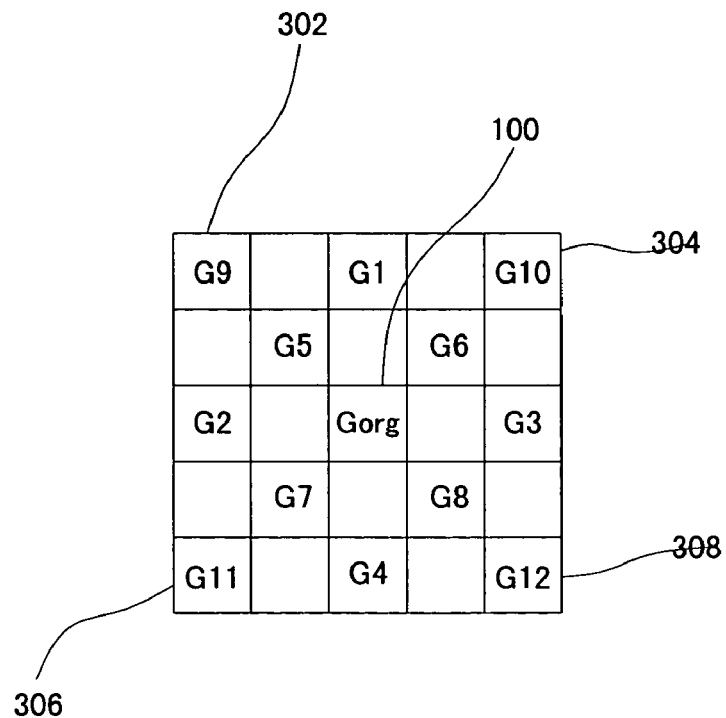
FIG. 5 is a diagram explaining a diagonal edge determination pixel relative to the focused pixel.

FIG. 5 shows a process for detecting a diagonal edge, which is applied when line crawl is detected. Presence or absence of a diagonal edge can be determined using four pixels, namely pixels 302 (G9), 304 (G10), 306 (G11), and 308 (G12), located in a diagonal direction relative to, in lines of the same color as, and separated by one line from, the focused pixel Gorg. That is, when an estimated value obtained using the pixels G9 and G12 and that using the pixels G10 and G11 differ significantly from each other, it can be determined that there is a diagonal edge.

When the original image includes a diagonal edge, pixels other than the pixels G1 through G4 are used in correction of the focused pixel Gorg.

Figure 6:
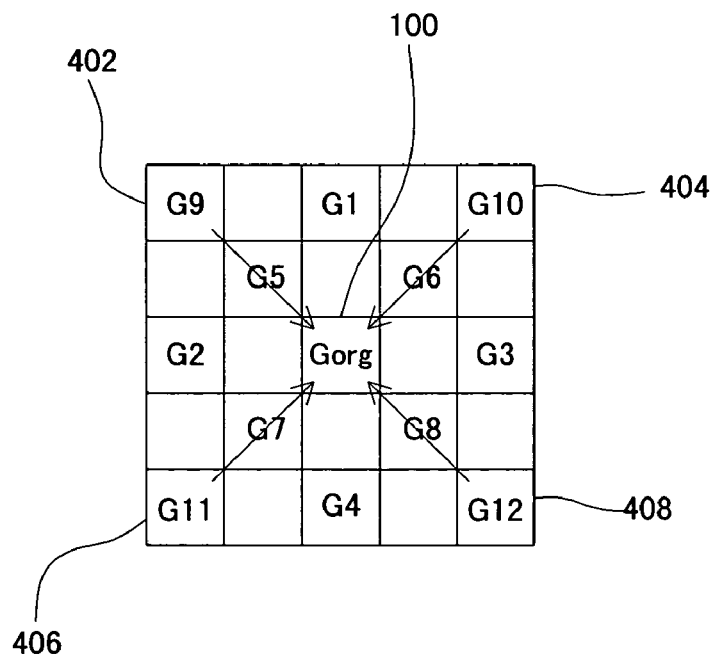
FIG. 6 is a diagram explaining a correction pixel relative to the focused pixel.

FIG. 6 shows a process for correcting a focused pixel Gorg, which is applied when it is determined that the original image includes a diagonal edge.

In the processing, the pixels G9 through G12, which are used for detection of a diagonal edge, rather than the pixels G1 through G4, are used to correct the focused pixel Gorg as correction pixels 402, 404, 406, 408. As described above, when the four pixels G9 through 12, located in a diagonal direction relative to, in lines of the same color as, and separated by one line from, the focused pixel Gorg, are used, the focused pixel Gorg can be corrected while eliminating the influence of line crawl and preserving the diagonal edge such that the edge does not disappear.

Figure 7:
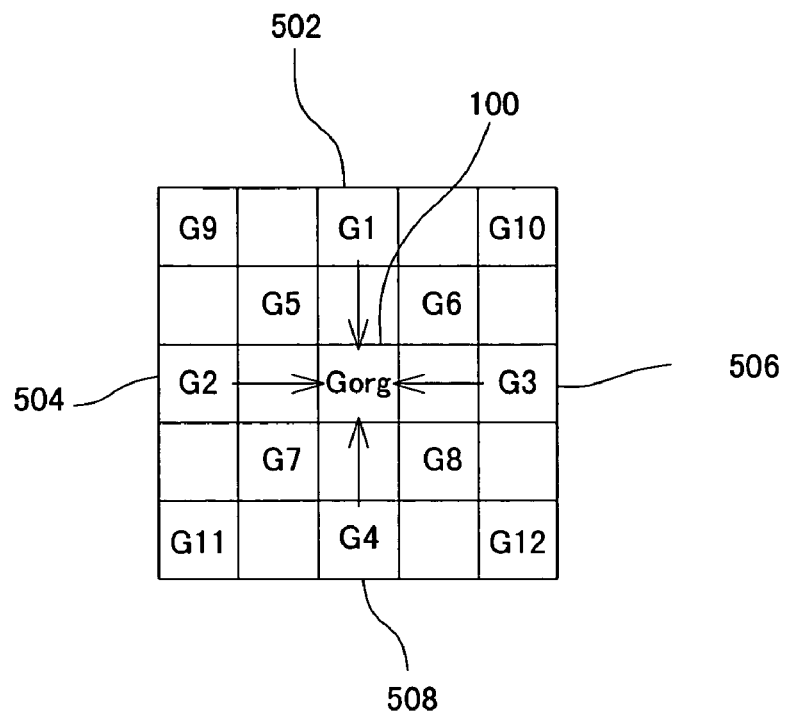
FIG. 7 is a diagram explaining another correction pixel relative to the focused pixel.

Meanwhile, FIG. 7 shows a process for correcting a focused pixel Gorg, which is applied when it is determined that the original image does not include a diagonal edge. Because no diagonal edge is included in the original image, the pixels G1 through G4 can be appropriately used for the correction without any problem, and, therefore, the pixels G1 through G4 are used to correct the focused pixel Gorg, similar to a conventional method. This can achieve correction while eliminating the influence of line crawl.

When no line crawl results, use of pixels separated by one line from the focused pixel Gorg for correction is unnecessary, and pixels directly adjacent to the focused pixel Gorg can be used for the correction, thereby avoiding the possibility of deterioration of the sharpness of the image.

Here, however, it should be noted that there is a possibility that the focused pixel Gorg is previously determined as defective only because a diagonal edge is contained in the focused pixel Gorg. That is, the previous determination as for whether or not the pixel Gorg is defective is made using the pixels G1 through G4 located in the vertical and horizontal directions relative to the focused pixel Gorg, as shown in FIG. 3, and, in such a manner of detection, mere presence of a diagonal edge results in a difference between the estimated value of the focused pixel Gorg based on the pixels G1 through G4, and the actual value of the focused pixel Gorg.

In view of the above, even though the focused pixel Gorg is once determined as defective, verification is made in the case where absence of line crawl is determined, prior to correction using the adjacent pixels to ensure that the focused pixel Gorg is in fact defective.

Figure 8:
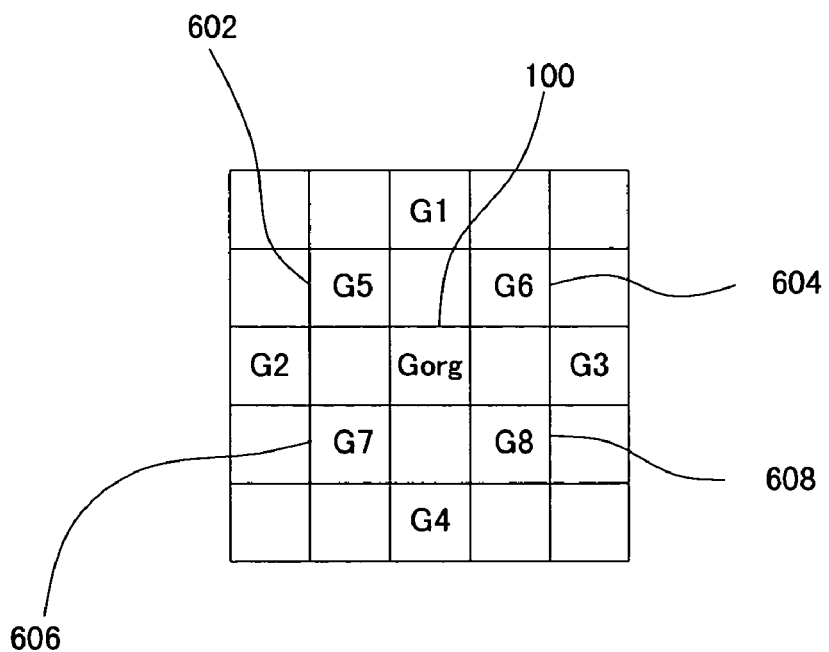
FIG. 8 is a diagram explaining still another correction pixel relative to the focused pixel.

FIG. 8 shows a process for verifying a defect in the focused pixel Gorg. While pixels GI through G4 are used as defect detection pixels, the pixels 602 (G5), 604 (G6), 606 (G7), 608 (G8), adjacent to the focused pixel Gorg, are used as verification pixels. It should be noted here that, because the absence of line crawl has already been determined, the adjacent pixels can at this point be used in the verification.

Specifically, the pixel value at the position of the pixel Gorg is estimated based on the pixels G5 through G8, and the obtained estimated value is compared with the actual value of the focused pixel Gorg. When the difference between the estimated and actual values is significant, specifically, when the difference is greater than or equal to a predetermined threshold value, it can be determined that the focused pixel Gorg is defective.

However, when the difference is less than the predetermined threshold value, it is determined that the focused pixel Gorg is not defective. In this case, the pixel value of the focused pixel is output without correction.

When the defective focused pixel Gorg is verified, on the other hand, the focused pixel Gorg is corrected using the adjacent pixels G5 through G8. Specifically, the pixel value of the pixel Gorg is replaced by the estimated value based on the pixels G5 through G8. In this correction, image sharpness can be preserved.

Figure 9:
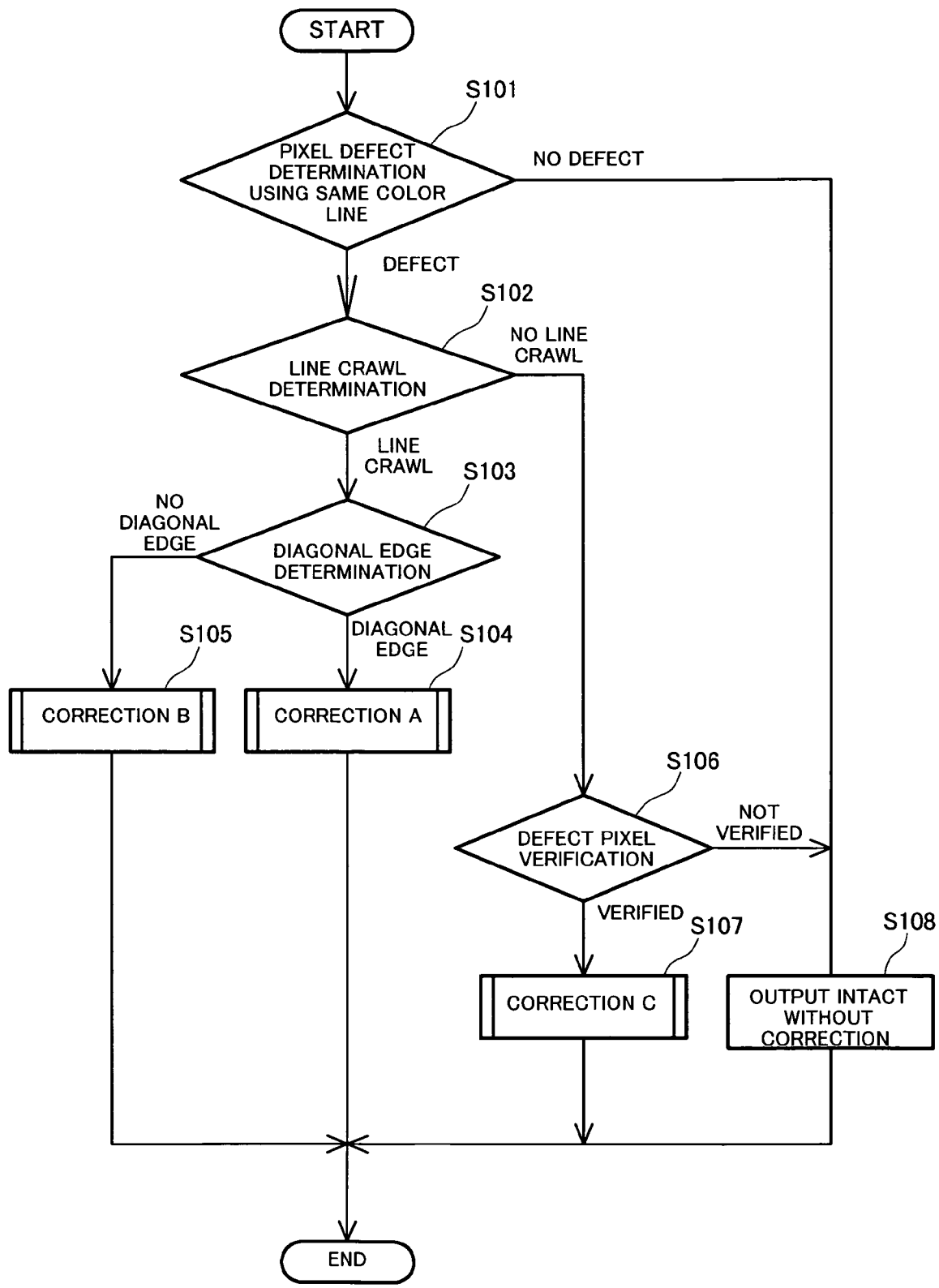
FIG. 9 is a flowchart in the embodiment.

FIG. 9 is a flowchart of the entire process in this embodiment, which is applied after a frame image is stored in the image memory 14.

Specifically, the processor 16 reads out pixel values of the four pixels G1 through G4, located in vertical and horizontal directions relative to, in lines of the same color as, and separated by one line from, the focused pixel Gorg, from the image memory 14 to detect a defect in the focused pixel Gorg (S101). When no defect is detected in the focused pixel Gorg, the pixel value of the focused pixel is output without correction to the subsequent process block (S108). When, on the other hand, a defect in the focused pixel Gorg is detected, whether or not there is any line crawl in or near the focused pixel Gorg is determined (S102).

Figure 10:
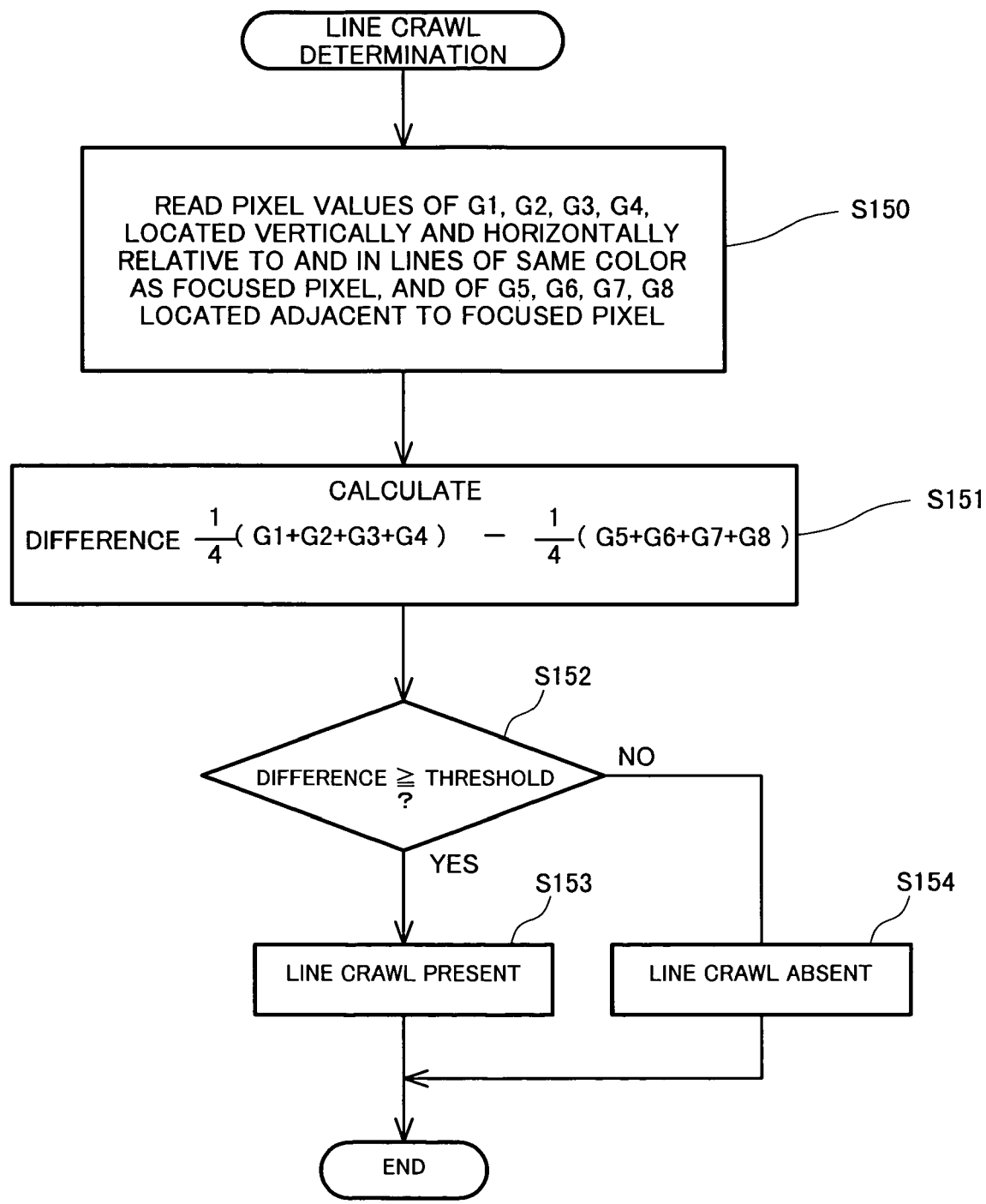
FIG. 10 is a flowchart of line crawl determination process.

FIG. 10 is a detailed flowchart of line crawl determination, which is carried out at step S102.

Specifically, the processor 16 reads out the pixel values of the pixels G1 through G4, located in the vertical and horizontal directions relative to, in lines of the same color as, and separated by one line from, the focused pixel Gorg, from the image memory 14. The processor 16 additionally reads out the pixel values of the pixels G5 through G8, located adjacent to, and of the same color as, the focused pixel Gorg (S150). The processor 16 then estimates the value (G1+G2+G3+G4)/4, using the pixels G1 through G4, and also the value (G5+G6+G7+G8)/4, using the pixels G5 through G8, and calculates the difference between these estimated values (S151).

The difference is then compared with a predetermined threshold (S152). The threshold may be either a fixed or adaptively varying value, as will be described later. When the difference is greater than or equal to the threshold value, it is determined that line crawl is caused (S153). When the difference is less than the threshold, on the other hand, it is determined that no line crawl is caused (S154).

Referring again to FIG. 9, respective processes to be applied when line crawl is caused and when no line crawl is caused will be described.

When line crawl is caused, pixels adjacent to the focused pixels Gorg cannot be appropriately used for correction. Instead, pixels of the same color as, and separated by one line from, the focused pixel Gorg are used. It is therefore next determined which of either the pixels in vertical and horizontal directions relative to the focused pixel Gorg or those in a diagonal direction are to be used for correction. This determination is made depending on whether or not the original image contains a diagonal edge.

Therefore, whether or not the original image contains a diagonal edge is determined (S103). When a diagonal edge is found, correction process A using pixels in the diagonal directions is employed to correct the focused pixel Gorg (S104). When there is no diagonal edge, on the other hand, correction process B using pixels in the vertical and horizontal directions relative to the focused pixel Gorg is employed to correct the focused pixel Gorg (S105).

Figure 11:
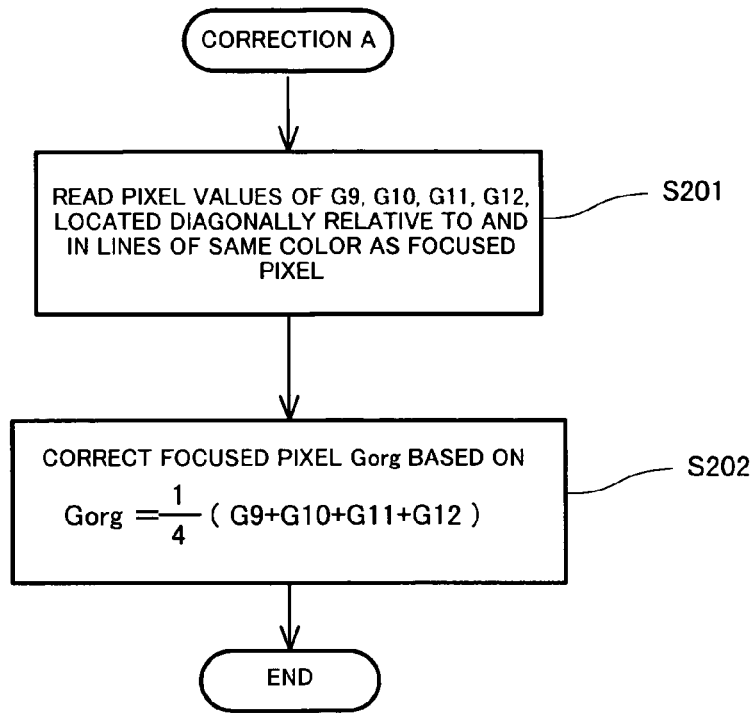
FIG. 11 is a flowchart for a correction process A.

FIG. 11 is a flowchart of a correction process A. Here, the pixel values of the four pixels G9, G10, G 11, G12, located in diagonal directions relative to, in lines of the same color as, and separated by one line from, the focused pixel Gorg are read out from the image memory 14 (S201). Thereafter, either of the average of the four pixel values, namely (G9+G10+G11+G12)/4, a weighted average of the four pixel values, each being weighted by a coefficient, or an average of the intermediate two of the four pixel values is obtained and used as a replacement for the pixel value of the focused pixel Gorg, to thereby correct the focused pixel Gorg (S202). It should be noted that the weighted average of the four pixel values may be obtained by, for example, applying a relatively large value to one of the four values, which is closer to the average of the four pixel values. By weighting the values in this manner, indefiniteness due to simple addition can be reduced.

Figure 12:
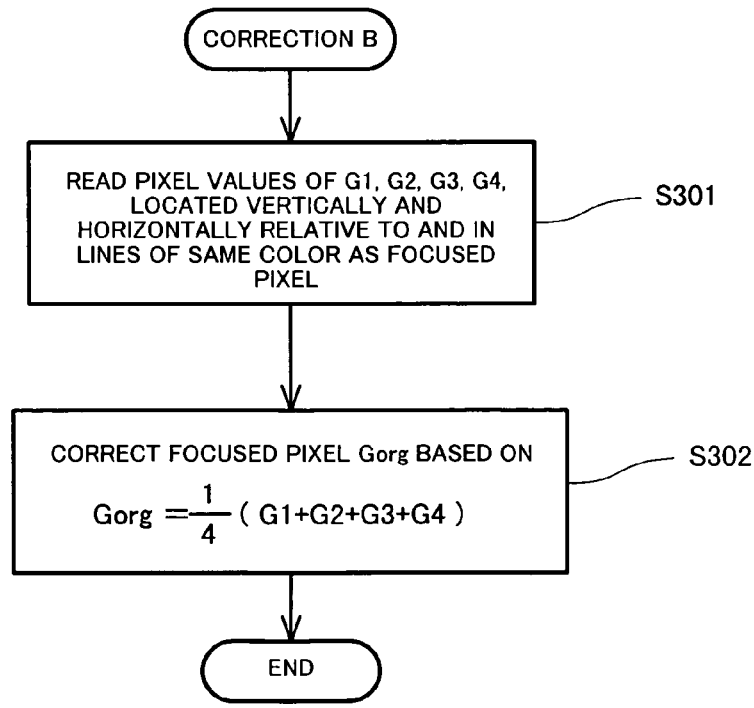
FIG. 12 is a flowchart for a correction process B.

FIG. 12 is a flowchart of a correction process B. Here, the pixel values of the four pixels G1, G2, G3, G4, located in vertical and horizontal directions relative to, in lines of the same color as, and separated by one line from, the focused pixel Gorg are read out from the image memory 14 (S301). Thereafter, either of the average of the four pixel values, namely (G1+G2+G3+G4)/4, a weighted average of the four pixel values, each being weighted by a coefficient, or an average of the intermediate two of the four pixel values is obtained as a replacement for the pixel value of the focused pixel Gorg, whereby the focused pixel Gorg is corrected (S302). It should be noted that the weighted average of the four pixel values may be obtained by, for example, applying a relatively large value to one of the four values, which is closer to the average of the four pixel values. By weighting the values in this manner, indefiniteness is reduced as compared to simple addition of unweighted values.

When line crawl is not caused, pixels directly adjacent to the focused pixel Gorg can be used as correction pixels. Before the correction, however, verification is made in order to ensure that the focused pixel is truly defective because the determination at S101, in which the focused pixel Gorg is determined defective, is made using pixels in the vertical and horizontal directions relative to the focused pixel Gorg, and in such a determination, should a diagonal edge containing the focused pixel Gorg be present, the estimated pixel value based on the pixels in the vertical and horizontal directions relative to the focused pixel Gorg results in different from the actual pixel value of the pixel Gorg. Consequently, it is possible that the focused pixel Gorg may be erroneously determined as defective. In order to avoid such an error, verification of the determination at S101 is performed, using a process which is not influenced by diagonal edges (S106).

Specifically, the pixel value of the focused pixel Grog is estimated based on the four pixels of the same color as, and located diagonally adjacent to, the focused pixel Gorg, and the estimated value is compared with the actual pixel value of the pixel Gorg. When the difference falls outside a predetermined range, it is verified that the focused pixel is defective.

When the defectiveness of the focused pixel is verified, correction process C using four adjacent pixels of the same color is performed for correction (S107).

When, on the other hand, the defectiveness of the focused pixel is not verified, the focused pixel Gorg is treated as not defective and the pixel data for the focused pixel Gorg is output without correction (S108).

It should be noted that, when the pixels in the diagonal directions are used in the determination at S101 in addition to those in the horizontal and vertical directions, verification at S106 is unnecessary.

Figure 13:
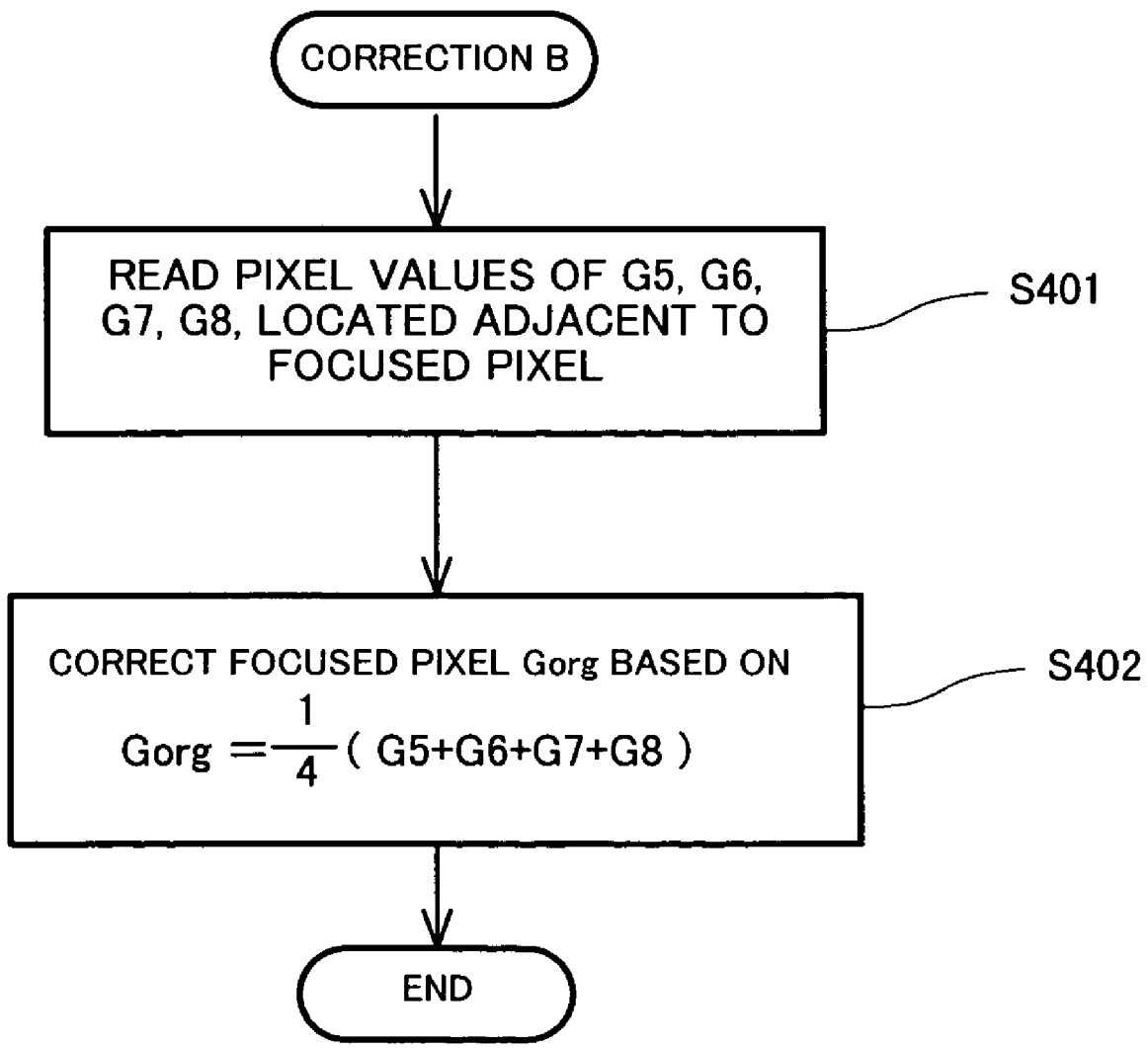
FIG. 13 is a flowchart for a correction process C.

FIG. 13 is a flowchart of a correction process C. Specifically, the pixel values of the four pixels G5, G6, G7, G8, located adjacent to the focused pixel Gorg, are read out from the image memory 14 (S401). Either of the average of the four pixel values, namely (G5+G6+G7+G8)/4, a weighted average of the four pixel values, each being weighted by a coefficient, or the average of the intermediate two of the four pixel values is obtained and used to replace the pixel value of the focused pixel Gorg for correction (S402). It should be noted that the weighted average of the four pixel values may be obtained by, for example, applying a relatively large value to one of the four values, which is closer to the average of the four pixel values. By weighting the values in this manner, indefiniteness due to simple addition can be reduced.

As described above, in this embodiment, modification of a method for correcting a focused pixel Gorg depending on the presence or absence of line crawl and a diagonal edge enhances the accuracy of correction.

In this embodiment, as the method used to correct a focused pixel Gorg is modified depending on the presence or absence of line crawl, accuracy in determining the presence or absence of line crawl significantly affects the accuracy of correction of the focused pixel Gorg. To enhance this accuracy, the threshold for use in comparison with a difference at S152 in FIG. 10 is therefore preferably an adaptively varying value, rather than a fixed value.

Specifically, the processor 16 sets expectable noise levels with respect to all pixel values according to ISO sensitivity and image capturing conditions for a digital camera, so that the threshold is increased or decreased for adjustment according to the noise level.

Noise level setting may be achieved using a method, for example, in which an image of a uniformly colored object with no pattern is captured in advance and S/N data obtained from the image is stored in a memory. In the image capturing, image capturing conditions, such as ISO, are varied, so that the S/N data relative to each of the conditions is stored in the memory. While using the S/N data for each of the conditions, a noise level is set. This manner of setting can improve correction accuracy. It should be noted that, higher ISO sensitivity generally leads to a higher noise level. Therefore, while a default threshold is prestored in the program memory 18, the processor 16 adds a noise level to the default threshold so that a threshold can be set such that a larger level leads to a larger threshold. As an example, a threshold may be set uniquely according to ISO sensitivity. With the above, erroneously determining, due to the influence of noise, that line crawl is caused when no line crawl is actually caused can be prevented.

What is claimed is:

1. A pixel defect correction device for correcting a defect in any pixel in a group of pixels arranged as predetermined, comprising:

defect detection means for detecting a defect in a focused pixel, using pixels surrounding the focused pixel; wherein the group of pixels are disposed on a single image sensor filtered by a color filter having two or more colors arranged in a predetermined array so that the group of pixels contain two or more color signals;

line crawl determination means for determining the presence or absence of line crawl, a wavelength of light passing through one color of a filter that reaches a deeper site under a light receiving surface of an image sensor resulting in electric charge that appears as noise in adjacent pixels, around a defective pixel;

correction means for correcting the defective pixel that uses pixels selected according to the presence or absence of a line crawl; and diagonal edge determination means for determining the presence or absence of a diagonal edge which includes, as a part thereof, the defective pixel;

wherein when line crawl is present, the correction means corrects the defective pixel while using pixels selected according to the presence or absence of a diagonal edge.

2. A pixel defect correction device according to claim 1, wherein when it is determined that both line crawl and a diagonal edge are present, the correction means corrects the defective pixel using a plurality of pixels located in a diagonal direction relative to, and in lines of a same color, the defective pixel.

3. A pixel defect correction device according to claim 1, wherein when it is determined that line crawl is present and that no diagonal edge is present, the correction means corrects the defective pixel using a plurality of pixels located in vertical and horizontal directions relative to, and in lines of a same color as, the defective pixel.

4. A pixel defect correction device according to claim 1, further comprising:

verification means for verifying, when line crawl is absent, a defect in the defective pixel, using a second set of surrounding pixels which are different from the surrounding pixels used by the defect detection means.

5. A pixel defect correction device according to claim 4, wherein when a defect is verified by the verification means, the correction means corrects the defective pixel using the second set of surrounding pixels, and when a defect is not verified, the defective pixel is output without correction.

6. A pixel defect correction device according to claim 4, wherein the surrounding pixels used by the defect detection means comprise a plurality of pixels located in a line of a same color as the focused pixel, and the second set of surrounding pixels comprises a plurality of pixels adjacent to the focused pixel.

7. A pixel defect correction device according to claim 1, wherein the line crawl determination means determines the presence or absence of line crawl around a defective pixel by comparing a difference between a pixel value at a position of the focused pixel which is estimated using a plurality of pixels of a same color as, and located in lines separated by one line from, the focused pixel, and a pixel value at a position of the focused pixel which is estimated using a plurality of pixels of a same color as, and adjacent to, the focused pixel, with a threshold.

8. A pixel defect correction device according to claim 7, wherein the threshold is variably set depending on a noise level of a pixel.

* * * * *